United States Patent
Xu et al.

(10) Patent No.: US 11,262,883 B2
(45) Date of Patent: Mar. 1, 2022

(54) ASSOCIATING BROWSER WITH APPLICATION

(71) Applicant: Hangzhou Hikvision System Technology Co., Ltd., Hangzhou (CN)

(72) Inventors: Feng Xu, Hangzhou (CN); Xiangzhen Chen, Hangzhou (CN); Lina Niu, Hangzhou (CN)

(73) Assignee: Hangzhou Hikvision System Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/652,656

(22) PCT Filed: May 15, 2019

(86) PCT No.: PCT/CN2019/087078
§ 371 (c)(1),
(2) Date: Mar. 31, 2020

(87) PCT Pub. No.: WO2019/242435
PCT Pub. Date: Dec. 26, 2019

(65) Prior Publication Data
US 2021/0105314 A1 Apr. 8, 2021

(30) Foreign Application Priority Data
Jun. 22, 2018 (CN) .......................... 201810651499.0
Oct. 31, 2018 (CN) .......................... 201811288111.1

(51) Int. Cl.
*G06F 3/0481* (2013.01)
*G06F 9/451* (2018.01)
(Continued)

(52) U.S. Cl.
CPC ............ *G06F 3/0481* (2013.01); *G06F 9/451* (2018.02); *G06F 9/452* (2018.02);
(Continued)

(58) Field of Classification Search
CPC ..... G06F 3/0481; G06F 9/451; G06F 9/45529
See application file for complete search history.

(56) References Cited

U.S. PATENT DOCUMENTS 9,507,648 B1    11/2016  Abd-El-Malek et al.
2010/0313116 A1* 12/2010 Hyman ................. G06Q 10/00
                                                              715/240
(Continued)

FOREIGN PATENT DOCUMENTS

CN    103064738 A  *  4/2013
CN    103064738 A     4/2013
(Continued)

OTHER PUBLICATIONS

ISA State Intellectual Property Office of the People's Republic of China, International Search Report Issued in Application No. PCT/CN2019/087078, dated Aug. 14, 2019, WIPO, 4 pages.

(Continued)

*Primary Examiner* — Scott T Baderman
*Assistant Examiner* — Seung Woon Jung
(74) *Attorney, Agent, or Firm* — Fish & Richardson P.C.

(57) ABSTRACT

Methods, systems, and apparatus, including computer programs encoded on computer storage media for associating a browser with an application through a designated local service process are provided. One of the methods includes: receiving a window request instruction from a Web client, searching a designated browser window where the Web client is located according to the window request instruction, creating an application window to be associated with the designated browser window, and associating the application window with the designated browser window.

15 Claims, 9 Drawing Sheets

(51) Int. Cl.
*G06F 16/958* (2019.01)
*G06F 9/455* (2018.01)
*H04L 67/02* (2022.01)
*G06F 40/103* (2020.01)

(52) U.S. Cl.
CPC ........ *G06F 9/45529* (2013.01); *G06F 16/958* (2019.01); *H04L 67/02* (2013.01); *G06F 40/103* (2020.01)

(56) References Cited

U.S. PATENT DOCUMENTS

| | | |
|---|---|---|
| 2011/0289556 A1 | 11/2011 | Pieczul et al. |
| 2014/0189498 A1 | 7/2014 | Liverant et al. |
| 2014/0229821 A1 | 8/2014 | Abrahami |
| 2017/0054793 A1* | 2/2017 | Urbach .................. H04L 69/03 |
| 2018/0349283 A1* | 12/2018 | Bhatia ................ H04N 21/4782 |

FOREIGN PATENT DOCUMENTS

| | | |
|---|---|---|
| CN | 103678506 A | 3/2014 |
| CN | 103870103 | 6/2014 |
| CN | 104301788 | 1/2015 |
| CN | 105554553 | 5/2016 |
| CN | 103150312 B * | 7/2016 |
| CN | 105872710 | 8/2016 |
| CN | 106293315 | 1/2017 |
| CN | 108319416 | 7/2018 |

OTHER PUBLICATIONS

Extended European Search Report in European Appln. No. 19821564.2, dated Oct. 30, 2020, 13 pages.

\* cited by examiner

ASSOCIATING BROWSER WITH APPLICATION

CROSS-REFERENCE TO RELATED APPLICATIONS

The present application is a U.S. National Phase application under 35 U.S.C. § 371 of International Patent Application No. PCT/CN2019/087078, entitled "APPLICATION ASSOCIATING FOR BROWSER" and filed on May 15, 2019, which claims priority to Chinese patent application No. 2018106514990, entitled "METHOD AND APPARATUS FOR ASSOCIATING BROWSER WITH APPLICATION, ELECTRONIC DEVICE AND STORAGE MEDIUM" and filed on Jun. 22, 2018, and Chinese patent application No. 2018112881111, entitled "METHOD AND APPARATUS OF OPERATING WINDOW" and filed on Oct. 31, 2018, the disclosure of each of which is incorporated herein by reference in its entirety.

TECHNICAL FIELD

The present application relates to the field of computer technology and, in particular, to a method and an apparatus for associating a browser with an application, an electronic device, a storage medium, and a product.

BACKGROUND

Generally, a Web (World Wide Web) application develops a Web page program using, for example, JavaScript (an interpreted script language) technology based on a browser as a container. For a conventional Web application, use of JavaScript technology is enough. However, for some industry applications, JS kernel engine in a browser cannot meet higher requirements by the applications.

SUMMARY

In view of this, the present application provides a method and an apparatus for associating a browser with an application, an electronic device, a storage medium, and a product. The first aspect of the present application provides a method of associating a browser with an application, including: receiving a window request instruction from a Web client through a connection between a designated local service process and the Web client; through the designated local service process, searching for a designated browser window where the Web client is located according to the window request instruction, and creating an application window to be associated with the designated browser window; and through the designated local service process, associating the application window with the designated browser window.

According to an embodiment of the present application, after through the designated local service process, associating the application window with the designated browser window, the method further includes: through the designated local service process and based on an application request instruction from the Web client, triggering the application window associated with the designated browser window to establish a connection with an application server, so that the application server provides a data service for the application window.

According to an embodiment of the present application, searching for the designated browser window where the Web client is located according to the window request instruction includes: through the designated local service process, parsing a designated identifier carried by the window request instruction; and through the designated local service process, for example, by traversing local windows, finding a browser window whose title includes at least the designated identifier as the designated browser window.

According to an embodiment of the present application, associating the application window with the designated browser window includes: invoking the designated browser window with a handle of the designated browser window; and through the designated local service process, associating the application window with the designated browser window invoked with the handle.

According to an embodiment of the present application, associating the application window with the designated browser window invoked with the handle includes: through the designated local service process, parsing an embedding parameter carried by the window request instruction; through the designated local service process, deciding whether the embedding parameter indicates that embedding is allowed; if the embedding parameter indicates that embedding is allowed, through the designated local service process, establishing a parent-child relationship between the designated browser window and the application window, and taking the application window as a child window embedded in the designated browser window; and if the embedding parameter does not indicate that embedding is allowed, through the designated local service process, starting a position tracking timer, disposing the application window at a designated position of the designated browser window, and setting the application window to automatically follow the movement of the designated browser window.

According to an embodiment of the present application, the designated browser window includes at least a first tab page and a second tab page which are switchable, and the application window is associated with the first tab page. In this case, the method of associating a browser with an application further includes: through the designated local service process, hiding the application window according to a hiding instruction from the Web client, where the hiding instruction is sent by the Web client when the Web client monitors an event of switching from the first tab page to the second tab page in the designated browser window, and is for instructing to hide the application window displayed in the first tab page; and through the designated local service process, displaying the application window according to a displaying instruction from the Web client, where the displaying instruction is sent by the Web client when the Web client monitors an event of switching from the second tab page to the first tab page in the designated browser window, and is for instructing to display the hidden application window in the first tab page.

According to an embodiment of the present application, the method further includes: through the designated local service process, receiving a window processing request sent by the designated browser window; and through the designated local service process, processing the currently displayed application window according to the window processing request, so that a page element in the designated browser window that is covered by the application window is displayed normally.

According to an embodiment of the present application, processing the currently displayed application window according to the window processing request includes: determining and marking a display area of the page element as a cutout area; acquiring and marking a display area of the application window as a first display area; performing cutout processing on the first display area based on the cutout area to generate a second display area, where the second display area and the cutout area do not overlap with each other; and updating the display area of the application window as the second display area.

According to an embodiment of the present application, performing cutout processing on the first display area based on the cutout area to generate a second display area includes: performing an XOR (exclusive OR) operation on the cutout area and the first display area, to cut out the cutout area from the first display area to generate the second display area.

According to an embodiment of the present application, processing the currently displayed application window according to the window processing request includes: clipping a picture of the application window based on a window clipping request; sending the clipped picture to the designated browser window; and upon receiving a picture processing message sent by the designated browser window, hiding the application window, where the picture processing message is generated by the designated browser window when the designated browser window has inserted the picture at a corresponding position, and the corresponding position is a position of the application window in the designated browser window.

According to an embodiment of the present application, the method further includes: receiving a window restoration request sent by the designated browser window; and performing restoration processing on the application window according to the window restoration request.

The second aspect of the present application provides an apparatus for associating a browser with an application, including: an instruction receiving module configured to a window request instruction from a Web client through a connection between a designated local service process and the Web client; a searching and creating module configured to, through the designated local service process, search for a designated browser window where the Web client is located according to the window request instruction and create an application window to be associated with the designated browser window; and a window associating module configured to, through the designated local service process, associate the application window with the designated browser window.

According to an embodiment of the present application, the apparatus for associating a browser with an application further includes: an application connecting module configured to, through the designated local service process and based on an application request instruction from the Web client, trigger the application window to establish a connection with an application server, so that the application server provides a data service for the application window.

According to an embodiment of the present application, the searching and creating module includes: an identifier parsing unit configured to, through the designated local service process, parse a designated identifier carried by the window request instruction; and a window searching unit configured to, through the designated local service process, by traversing local windows, find a browser window whose title includes at least the designated identifier, and determine the found browser window as the designated browser window According to an embodiment of the present application, the window associating module includes: a handle invoking unit configured to invoke the designated browser window with a handle of the designated browser window; and a window associating unit configured to, through the designated local service process, associate the application window with the designated browser window invoked with the handle.

According to an embodiment of the present application, the window associating unit includes: a parameter parsing subunit configured to, through the designated local service process, parse an embedding parameter carried by the window request instruction; a parameter deciding subunit configured to, through the designated local service process, decide whether the embedding parameter indicates that embedding is allowed; an embedding mode subunit configured to, if the embedding parameter indicates that embedding is allowed, through the designated local service process, establish a parent-child relationship between the designated browser window and the application window, and take the application window as a child window embedded in the designated browser window; and a following mode subunit configured to, if the embedding parameter does not indicate that embedding is allowed, through the designated local service process, start a position tracking timer, dispose the application window at a designated position of the designated browser window invoked with the handle, and set the application window to automatically follow the movement of the designated browser window.

According to an embodiment of the present application, the designated browser window includes at least a first tab page and a second tab page which are switchable, and the application window is associated with the first tab page. In this case, the apparatus for associating a browser with an application further includes: a window hiding module configured to, through the designated local service process, hide the application window according to a hiding instruction from the Web client, where the hiding instruction is sent by the Web client when the Web client monitors an event of switching from the first tab page to the second tab page in the designated browser window, and is for instructing to hide the application window displayed in the first tab page; and a window displaying module configured to, through the designated local service process, display the application window according to a displaying instruction from the Web client, where the displaying instruction is sent by the Web client when the Web client monitors an event of switching from the second tab page to the first tab page in the designated browser window, and is for instructing to display the hidden application window in the first tab page.

According to an embodiment of the present application, the apparatus further includes: a request receiving module configured to, through the designated local service process, receive a window processing request sent by the designated browser window; and a window processing module configured to, through the designated local service process, process the currently displayed application window according to the window processing request, so that a page element in the designated browser window that is covered by the application window is displayed normally.

According to an embodiment of the present application, the window processing module includes: a cutout-area determining submodule configured to determine and mark a display area of the page element as a cutout area; a window-area determining submodule configured to acquire and mark a display area of the application window as a first display area; a cutout submodule configured to, perform cutout processing on the first display area based on the cutout area to generate a second display area, where the second display area and the cutout area do not overlap with each other; and a window-area updating submodule configured to update the display area of the application window as the second display area.

According to an embodiment of the present application, the cutout submodule is configured to perform an XOR operation on the cutout area and the first display area, to cut out the cutout area from the first display area to generate the second display area.

According to an embodiment of the present application, the window processing module includes: a clipping submodule configured to clip a picture of the application window; a picture sending submodule configured to send the clipped picture to the designated browser window; and a window hiding submodule configured to, upon receiving a picture processing message sent by the designated browser window, hide the application window, where the picture processing message is generated by the designated browser window after the designated browser window has inserted the picture at a corresponding position, and the corresponding position is a position of the application window in the designated browser window.

According to an embodiment of the present application, the apparatus further includes: a window restoration module configured to receive a window restoration request sent by the designated browser window, and perform restoration processing on the application window according to the window restoration request.

The third aspect of the present application provides an electronic device including: a processor; and a memory that stores a program that can be invoked by the processor; where when executing the program, the processor implements the method of associating a browser with an application according to any one of the above embodiments.

The fourth aspect of the present application provides a machine-readable storage medium storing a program that, when executed by a processor, causes the processor to implement the method of associating a browser with an application according to any one of the above embodiments.

The fifth aspect of the present application provides a computer program product that, when running on a computer, causes the computer to execute the method of associating a browser with an application according to any one of the above embodiment s.

The embodiment of the present application has the following beneficial effects. Associating the application window with the designated browser window through the designated local service process may be performed by presenting the application window on the designated browser window. However, in a specific data service, the data service of the application window is independent of the Web client, and the data loaded into the application window does not need to be implemented through the interface of the Web client. Therefore, the data service of the application will not be affected by the performance of the Web client itself, and there is no need for parsing private information by Web client. Thereby ensuring the performance when the application is presented on the Web client.

DETAILED DESCRIPTION OF THE EMBODIMENTS

Figure 1:
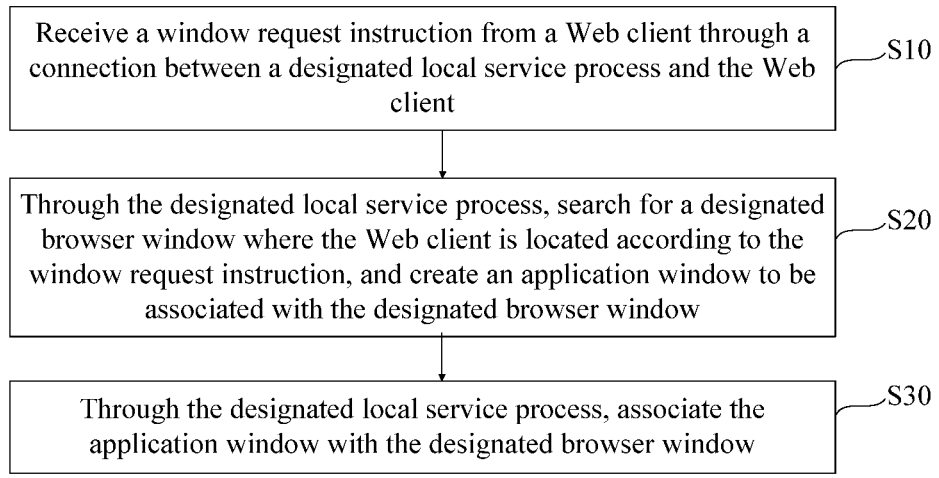
FIG. 1 is a schematic flowchart of a method of associating a browser with an application according to an embodiment of the present application.

The technical solutions in the embodiments of the present application will be clearly and completely described with reference to accompanying drawings in the embodiments of the present application. Apparently, the described embodiments are only a part of the embodiments of the present application, but not all of the embodiments. From the embodiments in the present application, all other embodiments obtained by a person of ordinary skill in the art without creative efforts shall fall within the protection scope of the present application.

Embodiments will be described in detail herein, with the illustrations thereof represented in the drawings. When the following descriptions involve the drawings, like numerals in different drawings refer to like or similar elements unless otherwise indicated. The embodiments described in the following embodiments do not represent all embodiments consistent with the present application. Rather, they are merely embodiments of apparatuses and methods consistent with some aspects of the present application as detailed in the appended claims.

The terms used in the present application are for the purpose of describing particular embodiments only, and are not intended to limit the present application. Terms determined by "a", "the" and "said" in their singular forms in the present application and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present application to describe various information, such information should not be limited to these terms. These terms are only used to distinguish one category of information from another. For example, without departing from the scope of the present application, first information may also be referred as second information; and similarly, second information may also be referred as first information. Depending on the context, the word "if" as used herein may be interpreted as "when" or "upon" or "in response to determining".

The embodiments of the present application can solve limitations and performance bottlenecks existing when implementing some applications through JavaScript technology. Especially for industry applications, such as monitoring applications, etc., the embodiments of the present application can enable a Web client to meet higher requirements by the applications, without private information parsed by the Web client, and the data service of the application is not affected by the performance of the Web client itself.

The method of associating a browser with an application according to an embodiment of the present application can be applied to a terminal device with a browser, which may be, for example, a smart phone, a personal computer (PC) device, a tablet device, a Personal Digital Assistant (PDA), or the like, and may also be any other terminal device that supports to load a Web page (Web client) by running the browser. The operating system on any of these terminal devices can be, for example, Android, IOS, Windows Phone, Windows system, MAC system, or the like. Controls of invoking a browser window and the like by different operating systems may be different, and can be adapted according to actual situations.

The method of associating a browser with an application according to an embodiment of the present application will be described in detail below, but the description is non-limiting.

In an embodiment, referring to FIG. 1, a method of associating a browser with an application includes steps S10~S30 as shown.

At step S10, a window request instruction from a Web client is received through a connection between a designated local service process and the Web client.

At step S20, through the designated local service process, a designated browser window where the Web client is located is searched for according to the window request instruction, and an application window to be associated with the designated browser window is created.

At step S30, through the designated local service process, the application window is associated with the designated browser window.

The designated local service process refers to a process provided in a terminal device according to an embodiment of the present application. The designated local service process can be started on the terminal device through an installation package, and the above steps S10 to S30 can be completed through the designated local service process. The installation package can be acquired in any way. It can be stored locally, or be acquired through an external storage device, or be downloaded onto the Web client, etc. With the designated local service process provided, a service can be provided for the Web client locally. At step S10, a window request instruction from the Web client is received through a connection between the designated local service process and the Web client.

A browser as a container for carrying Web pages is installed locally. Therefore, when the browser is loaded with a Web page, the Web client is carried locally, and a browser window is opened correspondingly on a local desktop. Of course, when multiple tabs are supported, multiple tabs can be opened in a browser window, and each tab is for accessing a Web page, but a Web page for only one tab may be presented at a time. The local desktop can be an entire desktop, or an independent desktop on a desktop, or multiple associated desktops.

In order to enable the designated local service process to provide a local service for the Web client, data interaction between the designated local service process and the Web client is required. Therefore, it is necessary to establish a connection between the designated local service process and the Web client. For this end, the Web client may send a connection request instruction in response to an external trigger, and the designated local service process may establish a connection with the Web client upon receiving the connection request instruction.

The connection established between the designated local service process and the Web client can be, for example, a WebSocket (WS) connection, a WebSocket connection based on secure socket layer (SSL) secure transmission (WSS connection), a hypertext transfer protocol (HTTP) connection, an HTTP over SSL (HTTPS) connection, or the like. Thus, after the connection is established between the designated local service process and the Web client, multiple request/response operations can be performed through this connection.

After the connection between the designated local service process and the Web client is successfully established, data interaction can be performed between the Web client and the designated local service process, and a window request instruction from the Web client can be received through the connection between the designated local service process and the Web client. The Web client can generate the window request instruction while the page is initialized or in response to an external trigger, and send the window request instruction to the designated local service process.

At step S20, through the designated local service process, a designated browser window where the Web client is located is searched for according to the window request instruction, and an application window to be associated with the designated browser window is created. In an embodiment, the application window may comprise a window having a handle, such as a play window, a document window, and the like.

After receiving the window request instruction, the designated local service process searches locally for the designated browser window, where the Web client is located, according to the window request instruction. For example, the search may be performed by traversing all windows on the desktop. In some embodiments, local windows may be traversed. When a browser window with a designated identifier is found, the remaining local windows may not be traversed. When there is only one browser window, the designated browser window can be found, when traversing the windows, according to own characteristics of the browser window by which the browser window can be distinguished from any other windows. When there are more than one browser windows, a matched designated browser window can be found by other characteristics, which will be described in detail with respect to subsequent embodiments.

The designated local service process can also create a required application window according to the window request instruction. The application window can be blank or customized. For a customized window, a corresponding customization parameter can be set in the designated local service process or in the window request instruction, so that a corresponding application window is created when the window request instruction is received. Subsequently the application window is to be associated with the found designated browser window.

The number of the application windows can be set as needed. When there are multiple application windows, the relationship between the application windows can also be set in the designated local service process or in the window request instruction, for example, as cascade, expansion, misplacement, or the like. The relationship between the application windows can be fixed or variable. For example, a first application window located above a second application window can be switched to be located below the second application window.

The sequence of searching for the designated browser window and creating the application window can vary. After the designated browser window is found and the application window is established, step S30 may be performed.

At step S30, through the designated local service process, the application window is associated with the designated browser window.

The application window created at step S20 is associated with the designated browser window through the designated local service process. For example, the application window may be provided in the designated browser window and may be kept in the designated browser window always. The application window as an application client may establish a connection with an application server to implement interaction and load application data. Data service of the application window is independent of that of the Web client. The application window operates application data in the same way as the application window operates as an application client per se, and thus the performance of the operation may not be limited by the Web client.

The application window may be presented on the designated browser window by associating the application window with the designated browser window through the designated local service process. However, in a specific data service, the data service of the application window is independent of the Web client, and it is unnecessary to load data into the application window through an interface of the Web client. Therefore, the data service of the application will not be affected by the performance of the Web client itself, and there is no need for parsing private information, thereby ensuring the performance when the application is presented on the Web client.

Figure 12:
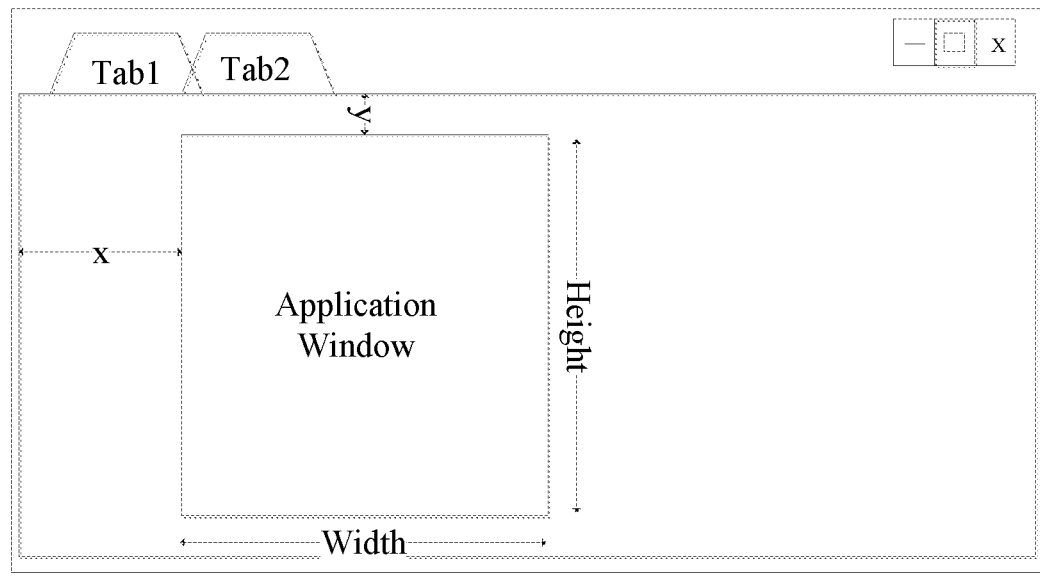
FIG. 12 is a schematic diagram illustrating an application window according to an embodiment of the present application.

When the application window is provided in the designated browser window according to the above embodiment, for example, when the application window is embedded in a page Tab1 as shown in FIG. 12, the display level of the application window may be higher than that of a page element in the designated browser window, and the page element (such as select, div, etc.) does not have a separate handle. As the user operates the designated browser window, there may be a situation where the application window blocks the page element.

In an embodiment, the Web client may decide whether a page element in the designated browser window is covered by the application window as follows.

Figure 13:
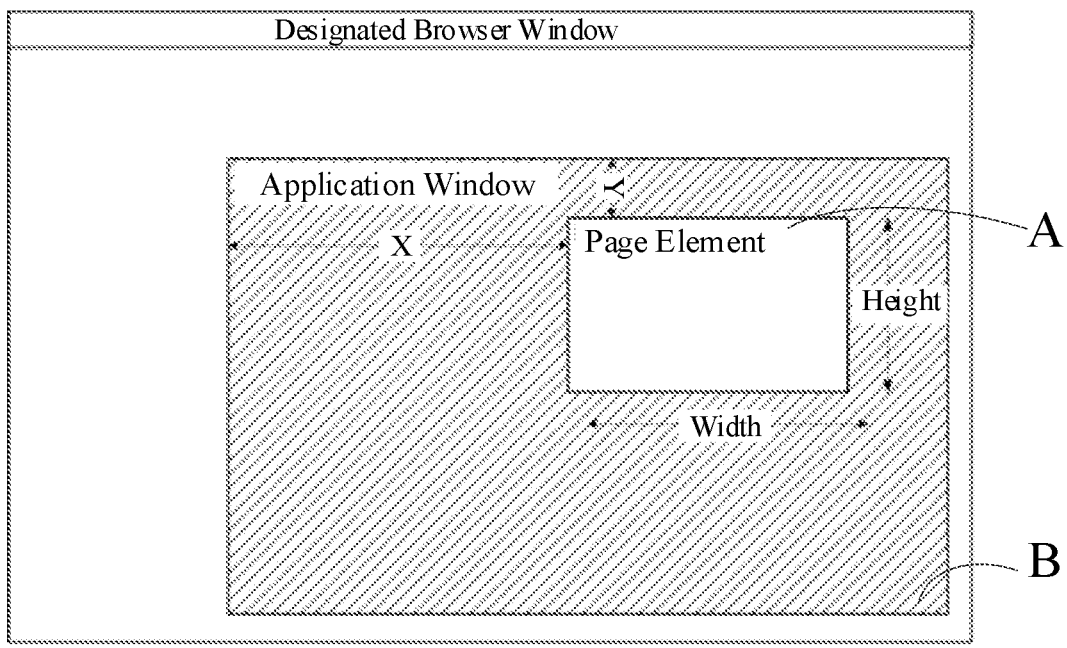
FIG. 13 is a schematic diagram illustrating a blocking relationship according to an embodiment of the present application.

When a designated event (such as select event) in the designated browser window is triggered, the designated browser window may receive an event response. With JavaScript technology, a page element corresponding to the designated event may be obtained, and it may be determined whether the page element corresponding to the designated event overlaps with the position of the application window. If there is an overlap, it is determined that a page element is covered by the application window. At this time, a page element at the overlapping position may be obtained as a covered page element. For example, as shown in FIG. 13, the position of the Web page element A overlaps with the position of the application window B, so the Web page element A is covered by the application window B.

Generally, the position and size of the application window are set in advance, and the position and size of each page element in the designated browser window are also set in advance. Based on the relationship between the positions and sizes of the two, it can be determined whether there is a page element whose position overlaps with that of the application window.

Figure 11:
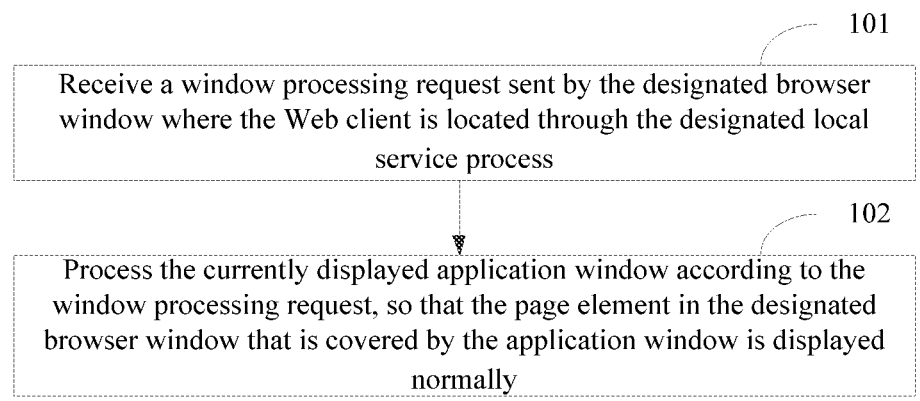
FIG. 11 is a schematic flowchart of operating a window in a method of associating a browser with an application according to an embodiment of the present application.

In an embodiment, if the application window may block a page element, the designated browser window where the Web client is located may send a window processing request to the designated local service process, so as to trigger the designated local service process to process the application window. As shown in FIG. 11, the method may include steps 101~102.

At step 101, a window processing request sent by the designated browser window where the Web client is located is received through the designated local service process.

At step 102, the currently displayed application window is processed according to the window processing request, so that the page element in the designated browser window that is covered by the application window is displayed normally.

After receiving the window processing request sent by the designated browser window where the Web client is located, the designated local service process may process the currently displayed application window according to the window processing request, so that the covered page element in the designated browser window can be displayed normally.

In an embodiment, the processing of the application window may be cutout processing, and accordingly the window processing request is a window cutout request. The window processing request may include information on the relative position of the page element relative to the application window. In an embodiment, the Web client may acquire the display area of the covered page element, and determine the information on the relative position of the covered page element relative to the application window according to the display area of the application window. The information on the relative position may involve relative position and relative size. For example, as shown in FIG. 13, the relative position of the Web page element A relative to the application window B is (x, y) and the relative size of the Web page element A relative to the application window B is (width, height). Step 102 may include sub-steps S11~S14.

At sub-step S11, a display area of the page element is determined according to the information on the relative position and marked as a cutout area.

At sub-step S12, a display area of the application window is acquired and marked as a first display area.

At sub-step S13, based on the cutout area, cutout processing is performed on the first display area to generate a second display area, where the second display area and the cutout area do not overlap with each other.

At sub-step S14, the display area of the application window is updated as the second display area.

Figure 14:
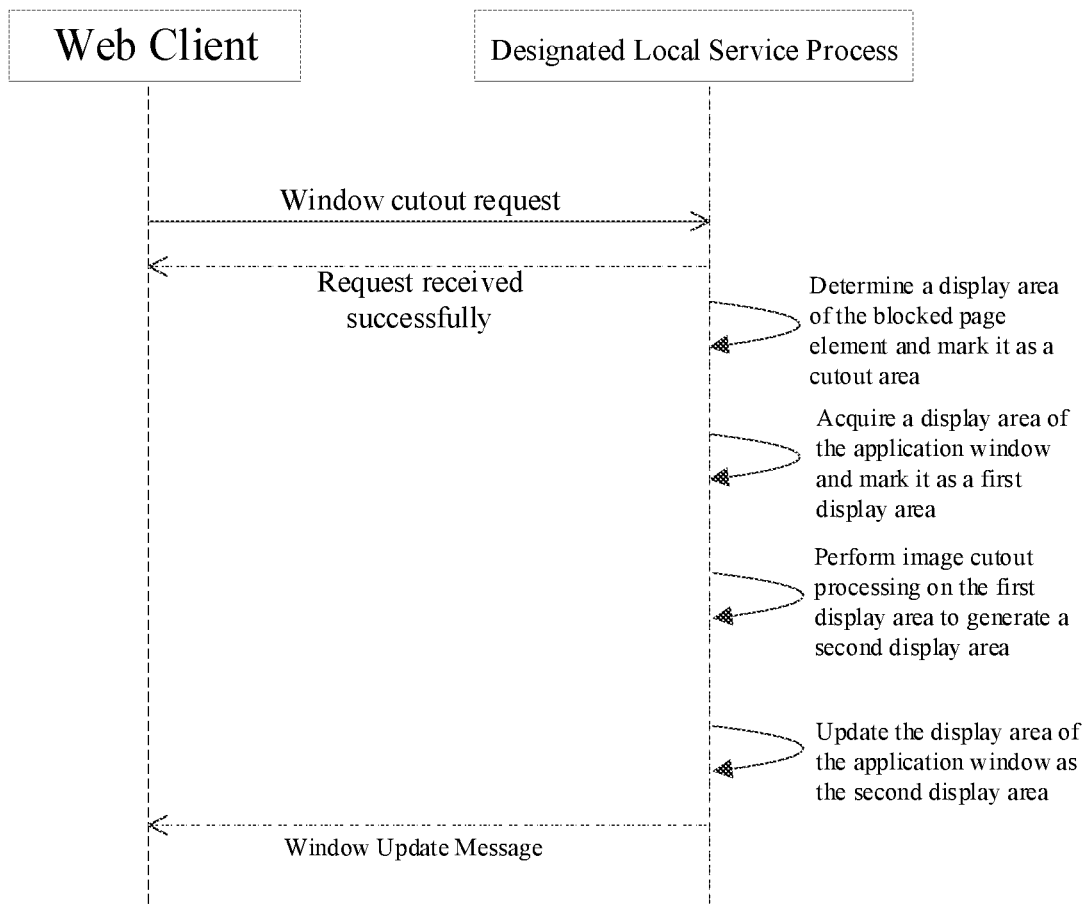
FIG. 14 is a flowchart of performing cutout processing on an application window, according to an embodiment of the present application.

In an embodiment, as shown in FIG. 14, after the designated local service process receives the window cutout request, the designated local service process may determine a display area of the covered page element according to the position and size of the application window relative to the browser window and the information on the relative position of the covered page element relative to the application window, and take the display area as the cutout area. For example, as shown in FIG. 13, according to the position (x, y) and the size (width, height) of the Web page element A relative to the preview window B, it can be determined that the display area of the Web page element A is the area A. In this case, the area A may be taken as the cutout area.

Also, the display area of the application window can be determined according to the position and size of the application window relative to the browser window. For example, as shown in FIG. 13, the display area of the application window is determined as the area B and marked as the first display area.

Subsequently, the first display area may be subjected to the cutout processing according to the cutout area to generate a second display area.

In some embodiments, the cutout processing may be as follows:

An XOR operation is performed on the cutout area and the first display area, so as to cut out the cutout area from the first display area to generate the second display area.

For example, as shown in FIG. 13, an XOR operation is performed on the area B and the area A, that is, obtaining an area of the area B other than the area A, so as to cut out the area A from the area B. The resulting updated display area is the hatched area as shown in FIG. 13.

After obtaining the second display area, the display area of the application window is updated as the second display area, so that the covered Web page element is exposed and the problem of the hierarchy of the application window and the page element of the designated browser window is solved. For example, as shown in FIG. 13, the display area of the application window is set as the hatched area, so that the area A is exposed.

After the designated local service process updates the display area of the application window as the second display area, a window update message can be generated and returned to the designated browser window to notify that the cutout processing is successfully completed.

In an embodiment, the processing of the application window may be a clipping processing, and accordingly the window processing request is a window clipping request. Step 102 may include sub-steps S21~S23.

At sub-step S21, a picture of the application window is clipped based on the window clipping request.

At sub-step S22, the clipped picture is sent to the designated browser window where the Web client is located.

At sub-step S23, when a picture processing message sent by the designated browser window is received, the application window is hidden. The picture processing message is generated after the designated browser window has inserted the picture at a corresponding position, and the corresponding position is the position of the application window in the designated browser window.

Figure 15:
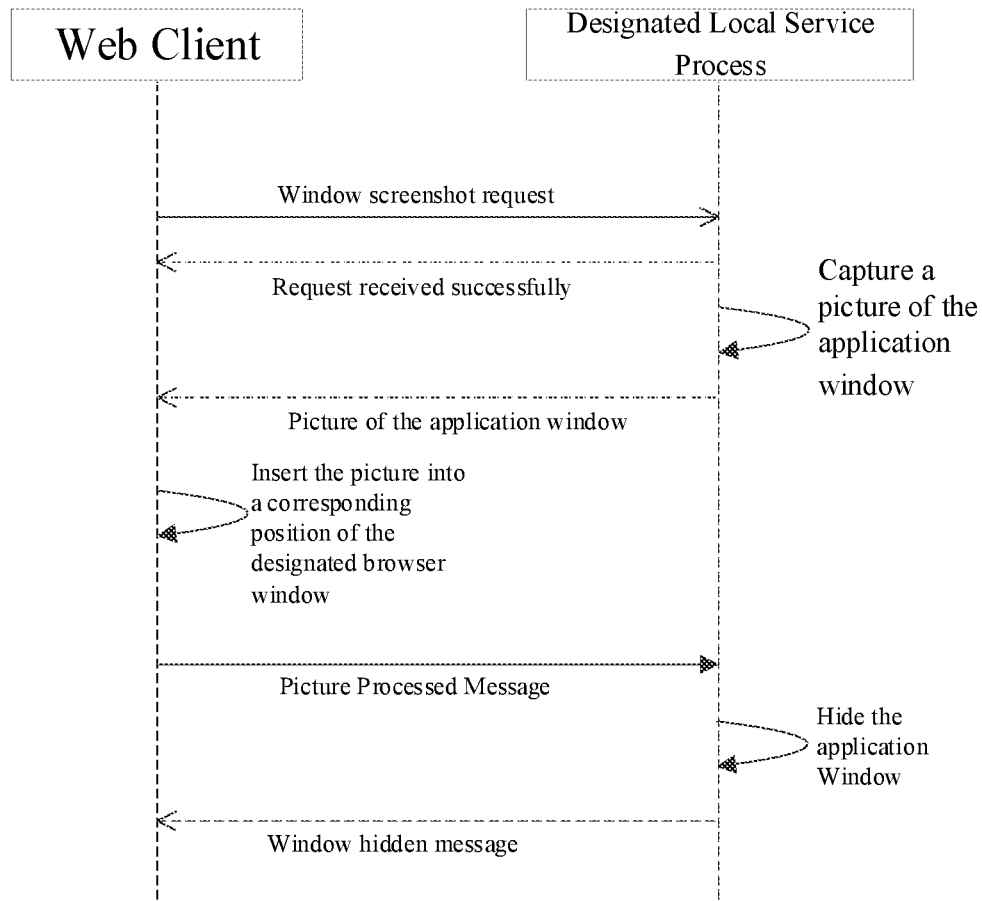
FIG. 15 is a flowchart of performing clipping processing on an application window according to an embodiment of the present application.

In an embodiment, as shown in FIG. 15, after the designated local service process receives the window clipping request, the designated local service process returns a response message indicating that the request is successfully received. Then, the designated local service process clips the application window to obtain the picture of the application window, and sends the picture of the application window to the designated browser window where the Web client is located.

After the Web client receives the picture of the application window, the Web client can insert the picture at the corresponding position of the application window in the designated browser window in various ways (e.g., img tag, canvas, remote acquisition, etc.). The corresponding position is the position where the application window is located, so that the display position of the picture of the application window is consistent with the embedded position.

After the picture is inserted in the designated browser window, the picture processing message is returned to the designated local service process. Upon receiving the picture processing message, the designated local service process hides the application window, and generates and sends a window hiding message to the designated browser window to notify that the application window has been hidden.

In the embodiment of the present application, after the application window is clipped to obtain the picture of the application window and the picture is placed at the position of a page element of the designated browser window where the application window is located, the application window that the user sees has the same effect as the picture of the application window. Moreover, the picture belongs to the page element of the designated browser window. Thus, after the application window is hidden, the requested page element, when operated, can overlay on the picture, thereby achieving an effect of displaying the page element.

It should be noted that, in practice, the above two processing methods for the application window may be selected as desired according to the requirements of the actual application scenario to process the application window, which is not limited in the embodiment of the present application. For example, if the application window is a play window, if during display, whether the content played in the play window is moving is not of interest, the clipping scheme can be employed, otherwise, the cutout scheme can be employed. In implementation, the developer can select an interface of a certain scheme to process the application window, or can design automatic selection of an adapted scheme interface for application window processing according to a display weight of the application window.

In an embodiment, the method may further include the following step:

receiving a window restoration request sent by the designated browser window; and performing restoration processing on the application window according to the window restoration request.

When the Web client detects that the covered page element disappears, for example, when the select drop-down box disappears, a window restoration request can be sent to the designated local service process. Upon receiving the window restoration request, the designated local service process performs restoration processing on the application window.

For example, in the above cutout processing scheme, the display area of the application window may be reset to the first display area. In the above clipping scheme, the Web client can be notified to delete the picture of the application window in the page and display the application window that was originally hidden.

In the embodiment of the present application, the designated local service process installed on the device may receive the window processing request sent by the loaded designated browser window, and process the currently displayed application window according to the window processing request, in order for the page element of the designated browser window that is covered by the application window to be displayed normally. It can solve the problem of hierarchy between the page elements of the designated browser window and the application window through the designated local service process, which is not limited to the size and position of the page element relative to the application window, which has a strong applicability.

Figure 2:
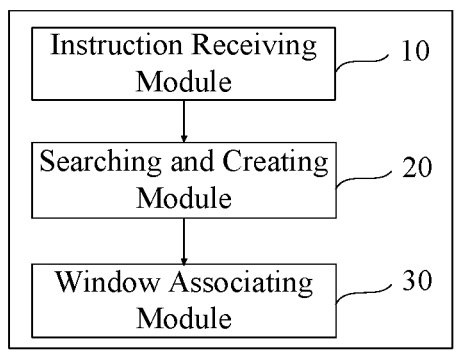
FIG. 2 is a block diagram of an apparatus for associating a browser with an application according to an embodiment of the present application.

In an embodiment, the above method steps may be executed by an apparatus 1 for associating a browser with an application. As shown in FIG. 2, the apparatus 1 for associating a browser with an application mainly includes three modules: an instruction receiving module 10, a searching and creating module 20, and a window associating module 30. The instruction receiving module 10 is configured to perform the above step S10, the searching and creating module 20 is configured to perform the above step S20, and the window associating module 30 is configured to perform the above step S30.

Figure 3:
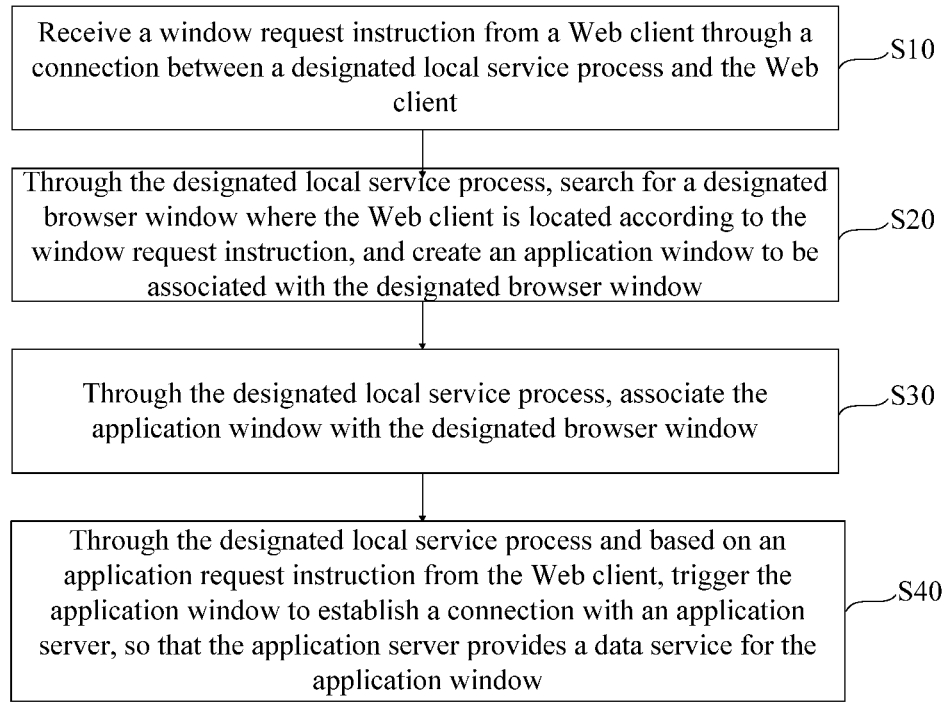
FIG. 3 is a schematic flowchart of a method of associating a browser with an application according to another embodiment of the present application.

In an embodiment, referring to FIG. 3, based on steps S10~S30, a method of associating a browser with an application may further include step S40, at which, through the designated local service process and based on the application request instruction from the Web client, the application window is triggered to establish a connection with an application server, so that the application server provides a data service for the application window.

Through steps S10 to S30, it can realize associating between the designated browser window and the application window, and has completed presenting the application window on the designated browser window. In practice, the application is generally run, so the application data needs to be loaded in the application window.

After the application window has been associated with the designated browser window, for subsequent application data loading, the Web client can send an application request instruction to the designated local service process. Upon receiving the application request instruction, the designated local service process can trigger the application window to establish a connection with the application server.

Of course, the application window itself can also be provided with an input component for triggering the application window to establish a connection with the application server, such as a button, and the application window can be triggered to connect with the application server upon the button being clicked on from outside.

After the application window is connected to the application server, the application server can provide application data to the application window. The application window acts as an application client and requests data from the application server. The application window can be triggered by an input component on the application window to request data, or the application window can be triggered through the designated local service process to request data, or the application window can automatically request data after connection. The application server refers to a server that can provide application data. The application data may be, for example, video data, audio data, text data, and the like.

At step S40, upon receiving the application request instruction, the designated local service process may request application data through the connection between the application window and the application server, and the application server may respond to the request and send the application data to the application window. No interaction is required between the application window and the Web client. Therefore, the performance of the application window in loading application data and running application data is not limited by the Web client.

Figure 4:
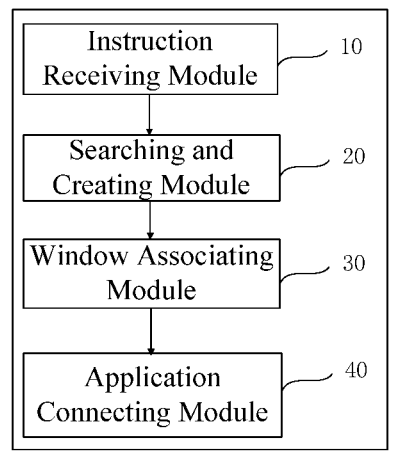
FIG. 4 is a block diagram of an apparatus for associating a browser with an application according to another embodiment of the present application.

Referring to FIG. 4, the apparatus 1 for associating an application to a browser may further include an application connecting module 40 for performing step S40 described above.

In an embodiment, searching for a designated browser window where the Web client is located through the designated local service process and according to the window request instruction at step S20 includes the following steps.

At S21, through the designated local service process, a designated identifier carried by the window request instruction is parsed.

At S22, through the designated local service process, for example, by traversing local windows, a browser window whose title includes at least the designated identifier is found, and the found browser window is determined as the designated browser window.

At step S21, upon receiving the window request instruction, the designated local service process may parse out the designated identifier carried in the window request instruction.

At present, there are more than one type of browsers, such as IE browser, Firefox browser, UC browser, 360 browser, etc., and on the same device, these browsers can be opened at the same time, and they may be operated through switching. Thus, when there is more than one browser window on the desktop, each browser window has to be identified by a designated identifier, so that the designated local service process can search for the designated browser window and operated on the designated browser window, otherwise the designated local service process cannot decide which is the designated browser window.

After the connection between the designated local service process and the Web client is successfully established, the designated local service process may return a designated identifier to the Web client, so that the Web client uses the designated identifier to modify the title of the browser window, and carries the designated identifier in subsequent instructions during subsequent interaction between the Web client and the designated local service process. The title of the browser window is the name in the title bar of the browser window. Through a designated identifier in the interaction between the Web client and the designated local service process, the Web client and the designated local service process can agree on the same target browser window.

The designated identifier is globally unique at least for all local windows. After receiving the instruction from the Web client, the designated local service process can parse out the designated identifier from the instruction, find a unique matching browser window based on the designated identifier, and perform subsequent operation on it. The designated identifier can be preset locally, and can be allocated through the designated local service process at runtime.

When the Web client modifies the title of the browser window, the Web client can completely replace the title with the designated identifier, or can replace part of the title with the designated identifier, or can add the designated identifier to the title as long as it can make the title of the browser window unique.

Next, step S22 is performed to find a browser window whose title includes at least the designated identifier through the designated local service process, and determine the found browser window as the designated browser window. In some embodiments, the local windows may be traversed, and after the browser window of the designated identifier is found, the remaining local windows may no longer be traversed.

After parsing the designated identifier of the window request instruction of the Web client, according to the designated identifier, the designated local service process can find the designated browser window whose name contains the designated identifier, for subsequent operations. It can avoid the problem when more than one browser is operating at the same time, a wrong window is identified due to instructions for alternating interactions.

After the designated local service process finds the designated browser window, it can obtain the handle of the designated browser window, through which the operation on the designated browser window can be realized. The handle is an identifier of the designated browser window in the system, and the corresponding designated browser window can be invoked and operated through the handle, so that the handle is used to implement the associating operation of the designated browser window at step S30.

Figure 5:
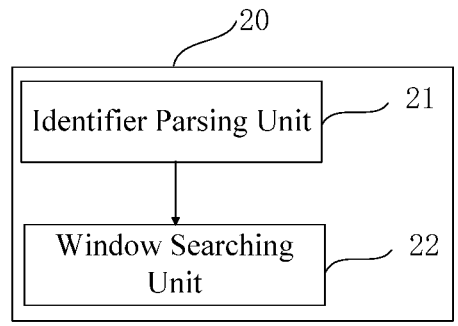
FIG. 5 is a block diagram of a searching and creating module in the apparatus shown in FIG. 4 according to an embodiment of the present application.

In an embodiment, as shown in FIG. 5, the searching and creating module 20 includes an identifier parsing unit 21 and a window searching unit 22. Step S21 may be performed by the identifier parsing unit 21, and step S22 may be performed by the window searching unit 22.

In an embodiment, at step S30, associating the application window with the designated browser window through the designated local service process includes the following steps.

At S31, the designated browser window is invoked with the handle of the designated browser window.

At S32, through the designated local service process, the application window is associated with the designated browser window invoked with the handle.

After the designated local service process finds the designated browser window, the designated local service process can obtain the handle of the designated browser window. At step S31, the handle can be used to invoke the corresponding designated browser window, and can invoke position parameters, invoking functions of the designated browser window, which is not limited.

At step S32, through the designated local service process, the application window is associated with the designated browser window invoked with the handle, each invoking function of the corresponding designated browser window are invoked with the handle of the designated browser window, and required operations can be performed on the designated browser window. For example, if the associating method is to establish a parent-child window relationship, the SetParent function of the designated browser window can be invoked.

Figure 6:
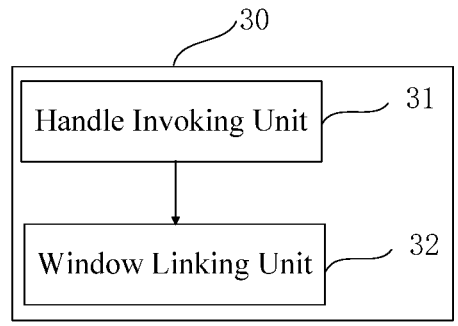
FIG. 6 is a block diagram of a window associating module in the apparatus shown in FIG. 4 according to an embodiment of the present application.

In an embodiment, as shown in FIG. 6, the window associating module 30 includes a handle invoking unit 31 and a window associating unit 32. Step S31 may be performed by the handle invoking unit 31, and step S32 may be performed by the window associating unit 32.

Further, at step S32, through the designated local service process, the application window is associated with the designated browser window invoked with the handle includes the following steps.

At S321, through the designated local service process, an embedding parameter carried by the window request instruction is parsed, the embedding parameter being for indicating whether embedding is allowed or not.

At S322, through the designated local service process, it is decided whether the designated browser window supports embedding according to the embedding parameter.

At S323, if the designated browser window supports embedding, through the designated local service process, a parent-child relationship is established between the designated browser window invoked with the handle and the application window, and the application window is taken as an embedded child window of the designated browser window.

At S324, if the designated browser window does not support embedding, through the designated local service process, a position tracking timer is enabled, the application window is placed at a designated position of the designated browser window invoked with the handle, and the application window is set to automatically follow the designated browser window.

At step S321, the embedding parameter in the window request instruction can be parsed through the designated local service process. The embedding parameter can be set in a fixed field of the window request instruction, so as long as the data of the fixed field is read, the embedding parameter can be obtained. The embedding parameter can be generated by the Web client by analyzing the browser type and written into the window request instruction, so the embedding parameter identifies whether the current designated browser window supports embedding.

Next, step S322 is performed, through the designated local service process, to decide whether the designated browser window supports embedding according to the embedding parameter. Since the embedding parameter can indicate whether the embedding is supported, the corresponding indication result can be obtained only by deciding from the embedding parameter.

Step S323 is for the situation when the designated browser window supports embedding. In this case, through the designated local service process, a parent-child relationship is established between the designated browser window invoked with the handle and the application window, and the application window is taken as an embedded child window of the designated browser window. The parent-child relationship between the designated browser window and the application window can be established by invoking a SetParent function of the designated browser window with the handle of the designated browser window.

Step S324 is for the situation when the designated browser window does not support embedding. In this case, a position tracking timer is enabled through the designated local service process, the application window is placed at a designated position of the designated browser window invoked with the handle, and the application window is set to automatically follow the designated browser window. It can realize no matter how the designated browser window moves, the application window is at the designated position in the designated browser window.

Due to different operating systems and browsers, the application window cannot be embedded normally in some browsers, so this application is further improved. When embedding is supported, the embedding mode is adopted; when it cannot be embedded, the following mode is adopted. The position tracking timer is enabled in the designated local service process, and when the position of the designated browser window changes the position of the application window is adjusted automatically.

Figure 7:
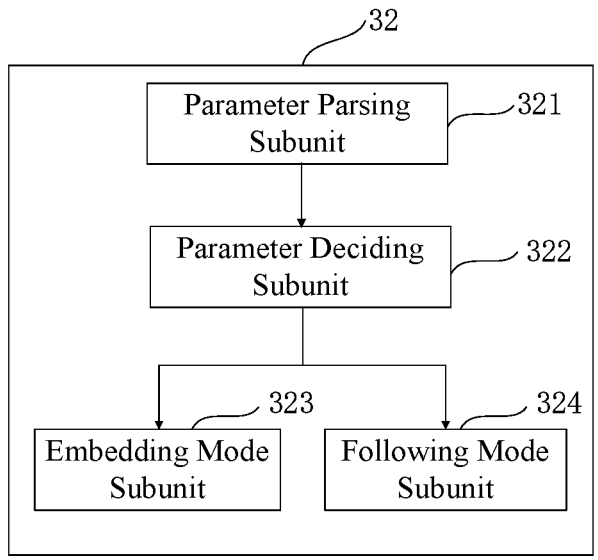
FIG. 7 is a block diagram of a window associating unit in the window associating module shown in FIG. 6 according to an embodiment of the present application.

In an embodiment, as shown in FIG. 7, the window associating unit 32 includes a parameter parsing subunit 321, a parameter deciding subunit 322, an embedding mode subunit 323, and a following mode subunit 324. Step S321 may be performed by the parameter analyzing subunit 321, step S322 may be performed by the parameter deciding subunit 322, step S323 may be performed by the embedding mode subunit 323, and step S324 may be performed by the following mode subunit 324.

Further, the window request instruction further carries a position parameter of the application window. At step S30, through the designated local service process, the application window is associated with the designated position of the designated browser window according to the position parameter.

The position parameter can include position coordinates of a starting point of the application window and a size of the application window. Of course, the position parameter can also be other parameters, such as position coordinates of a starting point and position coordinates of an end point, as long as it can determine the specific position of the application window in the designated browser window.

In embedding mode, the application window is embedded in the designated browser window at a position determined from the position parameter in the window request instruction.

In the following mode, the application window is placed in the designated browser window at a position determined from the position parameter in the window request instruction, and is set to automatically follow the designated browser window. Through indication of the position parameter, the application window can be set at the designated position in the designated browser window. After the tracking timer is enabled, the application window will automatically follow, so the position of the application window in the designated browser window is not changed as the designated browser window moves.

In an embodiment, the designated browser window includes at least a first tab page and a second tab page which are switchable, and the application window is embedded in the first tab page. In this case, the method of associating a browser with an application further includes the following steps.

At S51, through the designated local service process, the application window is hidden according to a hiding instruction from the Web client. The hiding instruction is sent by the Web client when the Web client monitors an event that the designated browser window switches from the first tab page to the second tab page, and is for instructing to hide the application window displayed in the first tab page.

At S52, through the designated local service process, the application window is displayed according to a displaying instruction from the Web client. The displaying instruction is sent by the Web client when the Web client monitors an event that the designated browser window switches from the second tab page to the first tab page, and is for instructing to display the hidden application window in the first tab page.

Since many browser windows can support multiple tabs which share a single browser window, when a tab page is switched, the tab page where the application window is located should no longer be displayed in the designated browser window, so the application window can be hidden at this time to prevent the application window from flowing into other tab page. When the tab page of the application window is switched back, the application window can be displayed in the designated browser window again.

The Web client can monitor an event occurring on the designated browser window. If switching of a tab page is monitored, a hiding instruction or a displaying instruction is issued. When the designated browser window is switched from the first tab page to the second tab page, the Web client sends a hiding instruction to the designated local service process, and the designated local service process hides the application window. When the designated browser window is switched from the second tab page to the first tab page, the Web client sends a displaying instruction to the designated local service process, and the designated local service process displays the application window in the designated browser window, with the position and size in display unchanged.

Of course, the designated browser window may also include other tab pages that can be switched. The relationship between the other tab pages and the first tab page and the processing method are the same as those between the second tab page and the first tab page, which will not be repeated herein.

Figure 8:
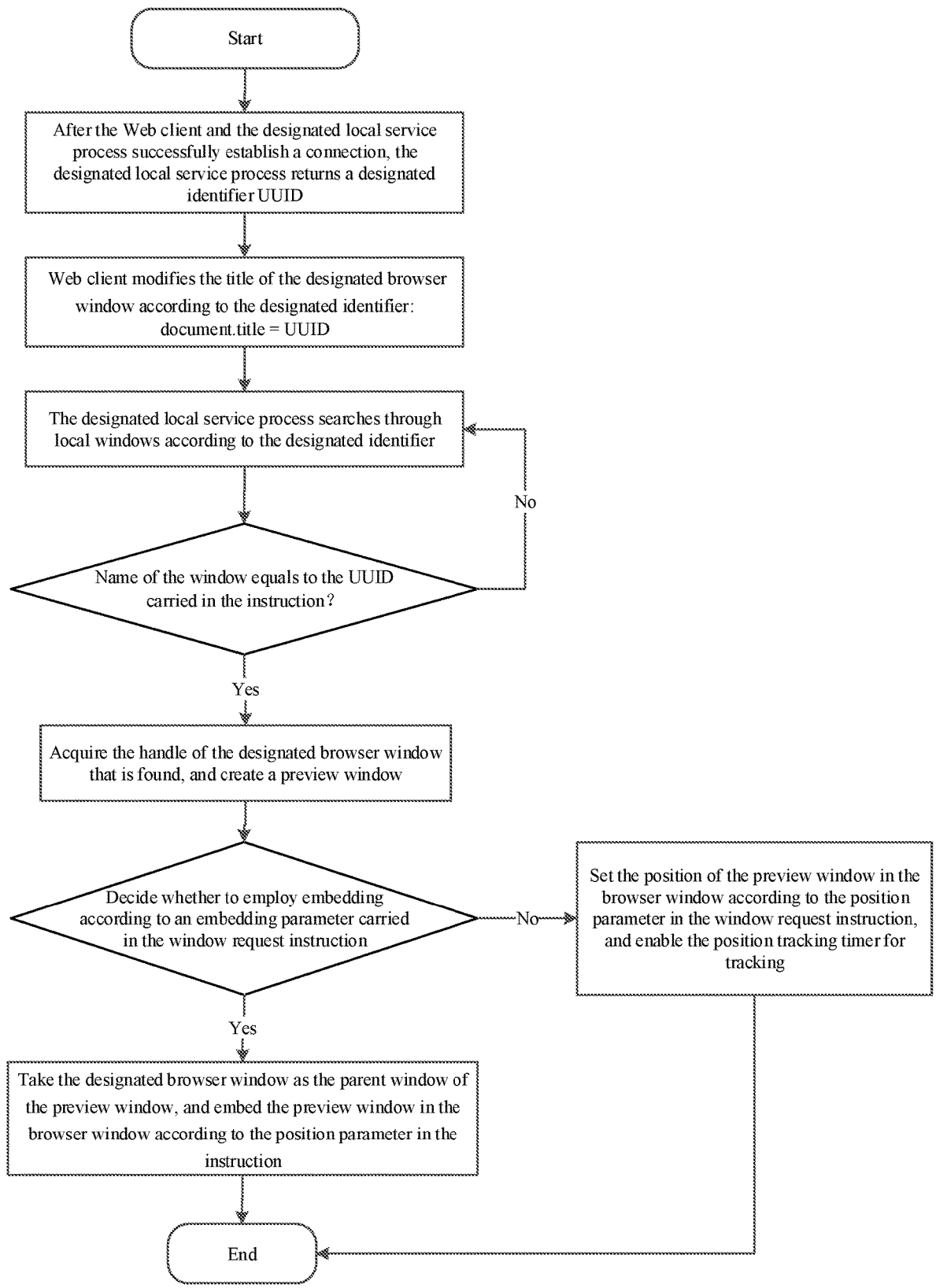
FIG. 8 is a schematic flowchart of a method of associating a browser with an application according to a more specific embodiment of the present application.

A more specific embodiment is described below, and the application window is a preview window as an embodiment for the illustration. Referring to FIG. 8, after the Web client and the designated local service process successfully establish a connection (which can be WS/WSS connection, HTTP/HTTPS connection), the designated local service process returns a designated identifier to the Web client. The designated local service process and the Web client agrees to carry the designated identifier subsequent instructions for interaction. The Web client sends a window request instruction (which can include: the position and size of the preview window) to the local process to create the preview window. Before sending the instruction, the Web client will modify the title of the browser window to the designated identifier. Upon receiving the window request instruction, the designated local service process traverses all the windows on the desktop, finds a designated browser window where the Web client is located which has a window name matching the designated identifier, and acquires the handle of the designated browser window. The designated local service process creates a preview window according to the window request instruction, and determines whether the designated browser window supports embedding according to the embedding parameter carried by the window request instruction. If so, the preview window is set as a child window of the designated browser window, to achieve the embedded effect, and subsequently, the preview window will move with the designated browser window. If not, according to a position parameter in the window request instruction, the preview window is set at a position in the designated browser window, and the position tracking timer is enabled for tracking.

Figure 9:
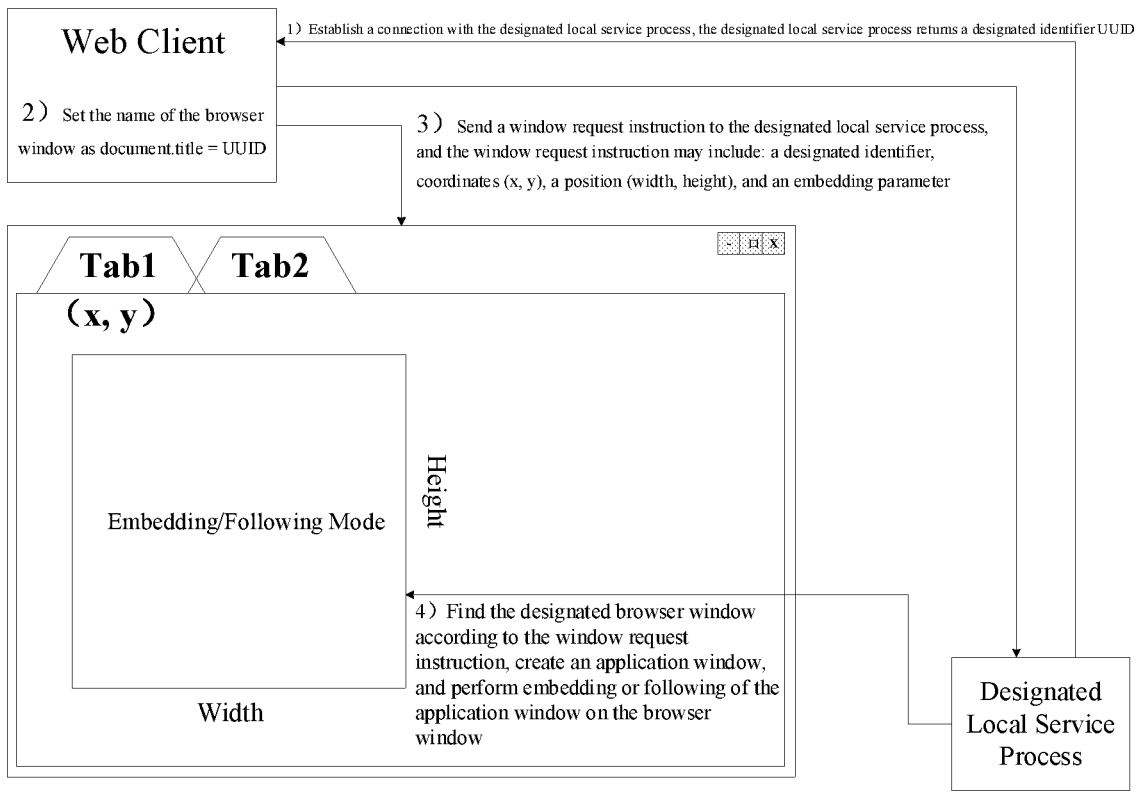
FIG. 9 is a schematic flowchart of a method of associating a browser with an application, with a graphical interface, according to an embodiment of the present application.

A more specific embodiment with a graphical interface is described below. Referring to FIG. 9, the Web client is loaded in a browser to be displayed in Tab 1. The following interaction will occur between the Web client and the designated local service process.

1) The Web client establishes a connection with the designated local service process, and the designated local service process returns a designated identifier UUID to the Web client;

2) the Web client sets the name in the title bar of the browser window where the Web client is located as the designated identifier UUID: document.title=UUID;

3) the Web client then sends a window request instruction to the designated local service process, and the window request instruction may include: a designated identifier, coordinates (x, y), a position (width, height), and an embedding parameter; and 4) the designated local service process traverses the windows on the desktop according to the designated identifier of the window request instruction, compares the title of the window with the designated identifier, finds a matching browser window, and creates an application window, and according to the embedding parameter, the coordinates (x, y) and the position (width, height), window embedding or following is employed on the browser. The application window is embedded in or located in Tab1 of the browser window and follows the browser window.

The present application also provides an apparatus for associating a browser with an application. In an embodiment, referring to FIG. 2, the apparatus 1 includes: an instruction receiving module 10 configured to receive a window request instruction from a Web client through a connection between a designated local service process and the Web client; a searching and creating module 20 configured to, through the designated local service process, search for a designated browser window where the Web client is located according to the window request instruction, and create an application window to be associated with the designated browser window; and a window associating module 30 configured to, through the designated local service process, associate the application window with the designated browser window.

In an embodiment, referring to FIG. 4, the apparatus 1 further includes: an application connecting module 40 configured to, through the designated local service process and based on the application request instruction from the Web client, trigger the application window to establish a connection with an application server, so that the application server provides a data service for the application window.

In an embodiment, referring to FIG. 5, the searching and creating module 20 includes: an identifier analyzing unit 21 configured to, through the designated local service process, parse out a designated identifier carried by the window request instruction; a window searching unit 22 configured to, through a designated local service process, for example, by traversing local windows, find a browser window whose title includes at least the designated identifier, and determine the found browser window as the designated browser window.

In an embodiment, referring to FIG. 6, the window associating module 30 includes: a handle invoking unit 31 configured to invoke the designated browser window with the handle of the designated browser window; and a window associating unit 32 configured to, through the designated local service process, associate the application window with the designated browser window invoked with the handle.

In an embodiment, referring to FIG. 7, the window associating unit 32 includes: a parameter parsing subunit 321 configured to, through the designated local service process, parse an embedding parameter carried by the window request instruction; and a parameter deciding subunit 322 configured to, through the designated local service process, decide whether the embedding parameter indicates that embedding is allowed; an embedding mode subunit 323 configured to, if the embedding parameter indicates that embedding is allowed, through the designated local service process, establish a parent-child relationship between the designated browser window invoked with the handle and the application window, and take the application window as an embedded child window of the designated browser window; and a following mode subunit 324 configured to, if the embedding parameter does not indicate that embedding is allowed, through the designated local service process, enable a position tracking timer, place the application window at a designated position of the designated browser window invoked with the handle, and set the application window to automatically follow the designated browser window.

In an embodiment, the designated browser window may include at least a first tab page and a second tab page which are switchable, and the application window is associated with the first tab page. In this case, the apparatus 1 may further include a window hiding module configured to, through the designated local service process, hide the application window according to a hiding instruction from the Web client, where the hiding instruction is sent by the Web client when the Web client monitors an event that the designated browser window switches from the first tab page to the second tab page, and is for instructing to hide the application window displayed in the first tab page; and a window displaying module configured to, through the designated local service process, display the application window according to a displaying instruction from the Web client, where the displaying instruction is sent by the Web client when the Web client monitors an event that the designated browser window switches from the second tab page to the first tab page, and is for instructing to display the hidden application window in the first tab page.

Figure 16:
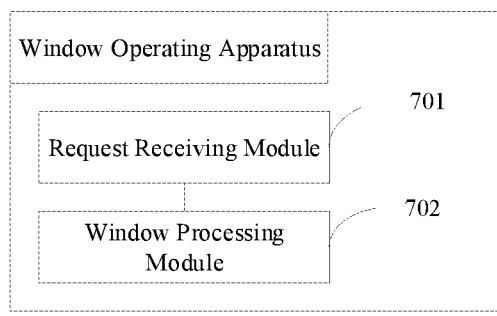
FIG. 16 is a block diagram of an apparatus for operating a window according to an embodiment of the present application.

In an embodiment, as shown in FIG. 16, the apparatus for associating a browser with an application may further include an apparatus for operating a window. The window operating apparatus may include a request receiving module 701 and a window processing module 702.

The request receiving module 701 is configured to, through the designated local service process, receive a window processing request sent by the designated browser window.

The window processing module 702 is configured to, process the currently displayed application window according to the window processing request, so that the page element in the designated browser window that is covered by the application window is displayed normally, where the application window is created by the designated local service process.

Figure 17:
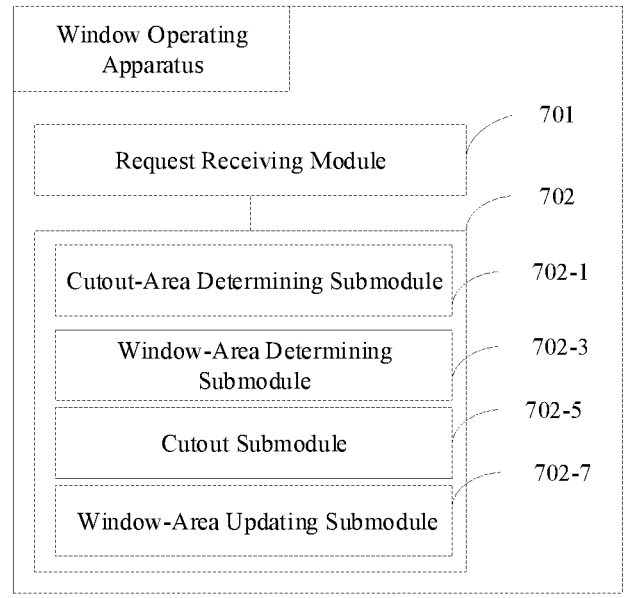
FIG. 17 is a block diagram of an apparatus for displaying a Web page in a scenario of performing cutout on an application window according to an embodiment of the present application.

In an embodiment, the window processing request may be a window cutout request, including information on the relative position of the page element relative to the application window. As shown in FIG. 17, the window processing module 702 may specifically include the following submodules:

a cutout-area determining submodule 702-1 configured to determine a display area of the page element according to the information on the relative position and mark it as a cutout area;

a window-area determining submodule 702-3 configured to acquire a display area of the application window and mark it as a first display area;

a cutout submodule 702-5 configured to, based on the cutout area, perform cutout processing on the first display area to generate a second display area, where the second display area and the cutout area do not overlap with each other; and a window-area updating submodule 702-7 configured to update the display area of the application window as the second display area.

In an embodiment, the cutout submodule 702-5 is specifically configured to perform an XOR operation on the cutout area and the first display area, to cut out the cutout area from the first display area to generate the second display area.

Figure 18:
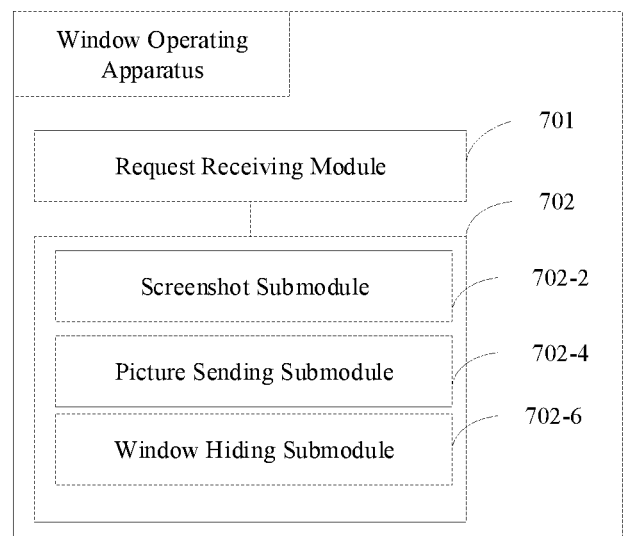
FIG. 18 is a block diagram of an apparatus for displaying a Web page in a scenario of performing clipping on an application window according to an embodiment of the present application.

In an embodiment, the window processing request may be a window clipping request. As shown in FIG. 18, the window processing module 702 may specifically include the following submodules:

a clipping submodule 702-2 configured to clip a picture of the application window based on the window clipping request;

a picture sending submodule 702-4 configured to send the clipped picture to the designated browser window; and a window hiding submodule 702-6 configured to, when receiving a picture processing message sent by the designated browser window, hide the application window, where the picture processing message is generated by the designated browser window when the designated browser window has inserted the picture at a corresponding position, and the corresponding position is the position of the application window in the designated browser window.

In an embodiment, the apparatus for operating a window may further include the following modules:

a window restoration module configured to receive a window restoration request sent by the designated browser window, and perform restoration processing on the application window according to the window restoration request.

For details of the implementation process of the functions and effects of each module and unit in the above apparatus, reference can be made to the implementation process of corresponding steps in the above method, which will not be repeated herein.

As for the apparatus embodiment, since it basically corresponds to the method embodiment, the relevant part may refer to the description of the method embodiment. The apparatus embodiment described above are only schematic, and the units described as separate components may or may not be physically separated, and the components displayed as units may or may not be physical units.

The present application further provides an electronic device including a processor and a memory; the memory stores a program that can be invoked by the processor. When the processor executes the program, the process implement the method of associating a browser with an application according to any one of the above embodiments.

Figure 10:
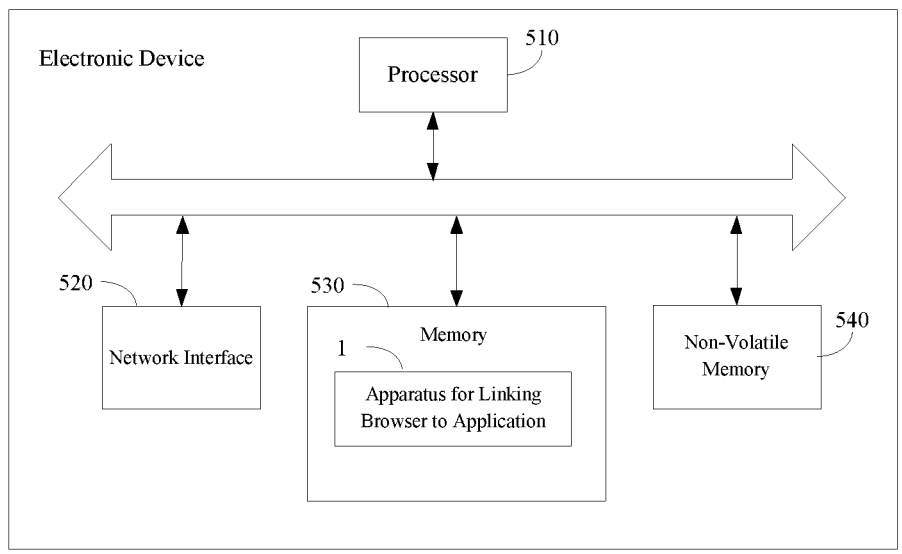
FIG. 10 is a block diagram of an electronic device according to an embodiment of the present application.

The embodiment of the apparatus for associating a browser with an application in this application may be applied to an electronic device. Taking software implementation as an embodiment, as an apparatus in a logical sense, it is formed by reading the corresponding computer program instructions in the non-volatile memory into the memory by the processor of the electronic device where it is located. In terms of hardware, as shown in FIG. 10, FIG. 10 is a hardware structure diagram of an electronic device in which the apparatus 1 of associating a browser with an application is located according to an embodiment of the present application. In addition to the processor 510, the memory 530, the network interface 520, and the non-volatile memory 540, the electronic device in which the apparatus 1 is located in the embodiment may generally include other hardware according to the actual function of the electronic device, details of which will not be described herein.

The present application also provides a machine-readable storage medium having a program stored thereon, and when the program is executed by a processor, the method of associating a browser with an application according to any one of the above embodiments is implemented.

This application also provides a computer program product that, when running on a computer, causes the computer to execute the method of associating a browser with an application according to any one of the above embodiments.

This application may take the form of a computer program product implemented on one or more storage media (including but not limited to disk storage, a CD-ROM, an optical storage, etc.) containing program codes. Machine-readable storage media includes permanent and non-permanent, removable and non-removable media, and information can be stored by any method or technology. Information may be computer-readable instructions, data structures, modules of a program, or other data. Embodiments of machine-readable storage media include, but are not limited to: a phase change memory (PRAM), a static random access memory (SRAM), a dynamic random access memory (DRAM), other types of a random access memory (RAM), a read-only memory (ROM), an electrically erasable programmable read-only memory (EEPROM), a flash memory or other memory technologies, read-only disc read-only memory (CD-ROM), digital versatile disc (DVD), or other optical storage, a magnetic tape cartridge, a magnetic tape storage or other magnetic storage device or any other non-transmission media which can be used to store information that can be accessed by computing devices.

The above are only preferred embodiments of this application, and are not intended to limit this application. Any modification, equivalent replacement, or improvement made within the spirit and principle of this application shall include within the scope of this application.

The invention claimed is:

1. A method of associating a browser with an application through a designated local service process, the method comprising:

receiving a window request instruction from a Web client of the browser;

searching, according to the window request instruction, for a designated browser window where the Web client is located;

creating an application window to be associated with the designated browser window;

associating the application window with the designated browser window;

triggering, based on an application request instruction from the Web client, the application window associated with the designated browser window to establish a connection with an application server, such that the application server provides a data service for the application window, and the data service is provided through the connection independently from the Web client;

receiving a window processing request from the designated browser window; and processing the application window currently displayed according to the window processing request, such that a page element in the designated browser window covered by the application window is displayed normally, wherein processing the application window currently displayed according to the window processing request comprises:

determining and marking a display area of the page element as a cutout area;
acquiring and marking a display area of the application window as a first display area;
performing cutout processing on the first display area based on the cutout area to generate a second display area, wherein the second display area and the cutout area do not overlap with each other; and
updating the display area of the application window as the second display area, and
wherein performing cutout processing on the first display area based on the cutout area to generate a second display area comprises:
performing an XOR operation on the cutout area and the first display area to cut out the cutout area from the first display area to generate the second display area.

2. The method according to claim 1, wherein searching for the designated browser window where the Web client is located according to the window request instruction comprises:
parsing a designated identifier carried by the window request instruction; and
finding a browser window whose title comprises at least the designated identifier as the designated browser window.

3. The method according to claim 1, wherein associating the application window with the designated browser window comprises:
invoking the designated browser window with a handle of the designated browser window; and
associating the application window with the designated browser window invoked with the handle.

4. The method according to claim 3, further comprising:
parsing an embedding parameter carried by the window request instruction; and
determining whether the embedding parameter indicates that embedding is allowed,
wherein associating the application window with the designated browser window invoked with the handle comprises one of:
in response to determining that the embedding parameter indicates that embedding is allowed, establishing a parent-child relationship between the designated browser window and the application window and taking the application window as a child window embedded in the designated browser window, and
in response to determining that the embedding parameter does not indicate that embedding is allowed, starting a position tracking timer, disposing the application window at a designated position of the designated browser window, and setting the application window to automatically follow the designated browser window.

5. The method according to claim 1, wherein the designated browser window comprises at least a first tab page and a second tab page which are switchable, and
wherein the application window is associated with the first tab page.

6. The method according to claim 5, further comprising:
hiding the application window according to a hiding instruction from the Web client, wherein the hiding instruction is sent by the Web client when the Web client monitors an event of switching from the first tab page to the second tab page in the designated browser window, the hiding instruction being for instructing to hide the application window displayed in the first tab page; and
displaying the application window according to a displaying instruction from the Web client, wherein the displaying instruction is sent by the Web client when the Web client monitors an event of switching from the second tab page to the first tab page in the designated browser window, the displaying instruction being for instructing to display the hidden application window in the first tab page.

7. The method according to claim 1, wherein processing the application window currently displayed according to the window processing request comprises:
clipping a picture of the application window;
sending the clipped picture to the designated browser window; and
upon receiving a picture processing message from the designated browser window, hiding the application window, wherein the picture processing message is generated by the designated browser window after the designated browser window has inserted the picture at a corresponding position that is a position of the application window in the designated browser window.

8. The method according to claim 1, further comprising:
receiving a window restoration request sent by the designated browser window; and
performing restoration processing on the application window according to the window restoration request.

9. An electronic device comprising:
at least one processor; and
at least one non-transitory machine readable storage medium coupled to the at least one processor having machine-executable instructions stored thereon that, when executed by the at least one processor, cause the at least one processor to perform operations comprising:
receiving, through a designated local service process, a window request instruction from a Web client;
searching, through the designated local service process and according to the window request instruction, for a designated browser window where the Web client is located;
creating, through the designated local service process, an application window to be associated with the designated browser window;
associating, through the designated local service process, the application window with the designated browser window;
triggering, based on an application request instruction from the Web client, the application window associated with the designated browser window to establish a connection with an application server, such that the application server provides a data service for the application window, and the data service is provided through the connection independently from the Web client;
receiving a window processing request from the designated browser window; and
processing the application window currently displayed according to the window processing request, such that a page element in the designated browser window covered by the application window is displayed normally,
wherein processing the application window currently displayed according to the window processing request comprises:

determining and marking a display area of the page
        element as a cutout area:
    acquiring and marking a display area of the application window as a first display area;
    performing cutout processing on the first display area based on the cutout area to generate a second display area, wherein the second display area and the cutout area do not overlap with each other; and
    updating the display area of the application window as the second display area, and
    wherein performing cutout processing on the first display area based on the cutout area to generate a second display area comprises:
        performing an XOR operation on the cutout area and the first display area to cut out the cutout area from the first display area to generate the second display area.

10. The electronic device according to claim 9, wherein searching for the designated browser window where the Web client is located according to the window request instruction comprises:
    parsing a designated identifier carried by the window request instruction; and
    finding a browser window whose title includes at least the designated identifier as the designated browser window.

11. The electronic device according to claim 9, wherein associating the application window with the designated browser window comprises:
    invoking the designated browser window with a handle of the designated browser window; and
    associating the application window with the designated browser window invoked with the handle.

12. The electronic device according to claim 11, wherein the operations further comprise:
    parsing an embedding parameter carried by the window request instruction; and
    determining whether the embedding parameter indicates that embedding is allowed,
    wherein associating the application window with the designated browser window invoked with the handle comprises one of:
        in response to determining that the embedding parameter indicates that embedding is allowed, establishing a parent-child relationship between the designated browser window and the application window and taking the application window as a child window embedded in the designated browser window, and
        in response to determining that the embedding parameter does not indicate that embedding is allowed, starting a position tracking timer, disposing the application window at a designated position of the designated browser window, and setting the application window to automatically follow the designated browser window.

13. A non-transitory machine readable storage medium coupled to at least one processor having machine-executable instructions stored thereon that, when executed by the at least one processor, cause the at least one processor to perform operations comprising:
    receiving, through a designated local service process, a window request instruction from a Web client;
    searching, through the designated local service process and according to the window request instruction, for a designated browser window where the Web client is located;
    creating, through the designated local service process, an application window to be associated with the designated browser window;
    associating, through the designated local service process, the application window with the designated browser window;
    triggering, based on an application request instruction from the Web client, the application window associated with the designated browser window to establish a connection with an application server, such that the application server provides a data service for the application window, and the data service is provided through the connection independently from the Web client;
    receiving a window processing request from the designated browser window; and
    processing the application window currently displayed according to the window processing request, such that a page element in the designated browser window covered by the application window is displayed normally,
    wherein processing the application window currently displayed according to the window processing request comprises:
        determining and marking a display area of the page element as a cutout area;
        acquiring and marking a display area of the application window as a first display area;
        performing cutout processing on the first display area based on the cutout area to generate a second display area, wherein the second display area and the cutout area do not overlap with each other; and
        updating the display area of the application window as the second display area, and
    wherein performing cutout processing on the first display area based on the cutout area to generate a second display area comprises:
        performing an XOR operation on the cutout area and the first display area to cut out the cutout area from the first display area to generate the second display area.

14. The non-transitory machine readable storage medium according to claim 13, wherein associating the application window with the designated browser window comprises:
    invoking the designated browser window with a handle of the designated browser window; and
    associating the application window with the designated browser window invoked with the handle.

15. The non-transitory machine readable storage medium according to claim 14, wherein the operations further comprise:
    parsing an embedding parameter carried by the window request instruction; and
    determining whether the embedding parameter indicates that embedding is allowed,
    wherein associating the application window with the designated browser window invoked with the handle comprises one of:
        in response to determining that the embedding parameter indicates that embedding is allowed, establishing a parent-child relationship between the designated browser window and the application window, and taking the application window as a child window embedded in the designated browser window, and
        in response to determining that the embedding parameter does not indicate that embedding is allowed, starting a position tracking timer, disposing the application window at a designated position of the designated browser window, and setting the application window to automatically follow the designated browser window.

\* \* \* \* \*